United States Patent
Cratsley, III (10) Patent No.: US 6,734,806 B1
(45) Date of Patent: May 11, 2004

(54) METHOD AND SYSTEM FOR SIGNALING UTILITY USAGE

(76) Inventor: Charles W. Cratsley, III, 2 Hill Way, Carrollton, VA (US) 23314

( * ) Notice: Subject to any disclaimer, the term of this patent is extended or adjusted under 35 U.S.C. 154(b) by 0 days.

(21) Appl. No.: 09/353,429

(22) Filed: Jul. 15, 1999

(51) Int. Cl.[7] .............................................. G08B 21/00
(52) U.S. Cl. ..................... 340/870.09; 702/61; 705/412
(58) Field of Search ....................... 340/870.09, 310.01; 705/412; 702/61

(56) References Cited

U.S. PATENT DOCUMENTS

| | | | | |
|---|---|---|---|---|
| 4,399,510 A | * | 8/1983 | Hicks .......................... | 705/412 |
| 4,924,404 A | * | 5/1990 | Reinke, Jr. .................... | 702/16 |
| 5,589,764 A | * | 12/1996 | Lee .............................. | 702/16 |
| 5,684,710 A | * | 11/1997 | Ehlers et al. .................. | 702/16 |
| 5,811,966 A | | 9/1998 | Lee | |
| 6,226,600 B1 | * | 5/2001 | Rodenberg, III et al. ..... | 702/61 |

* cited by examiner

Primary Examiner—Timothy Edwards
(74) Attorney, Agent, or Firm—Peter J. Van Bergen (57) ABSTRACT

A method and system are provided to continuously signal a utility's usage. A first device measures usage of the commodity in order to, for example, project usage over the course of a billing period and provide a first value indicative the projected usage. A second device allows a user to input a second value indicative of a threshold or budgeted level of usage. A processor generates a status value based on the difference between the first and second values. One or more of a plurality of different color indicators are displayed at any given time based on the status value. For example, three colored indicators (e.g., red, yellow and green) can be arranged to resemble a traffic signal where green can be indicative of a level of utility usage that is within budget, yellow can be indicative of utility usage that is approximately at budget, and red can be indicative of utility usage that is over budget.

24 Claims, 3 Drawing Sheets

METHOD AND SYSTEM FOR SIGNALING UTILITY USAGE

FIELD OF THE INVENTION

The invention relates generally to monitoring usage of a utility such as electricity, gas or water, and more particularly to a method and system for continuously signaling the usage of a utility for a consumer relative to a budgeted or peak amount entered by a consumer.

BACKGROUND OF THE INVENTION

Energy monitors are known in the art. Typically, energy consumption is displayed numerically as a monetary denomination, in units of energy or in units of the commodity (e.g., gas or electricity) being consumed. However, numerical display energy monitors present a variety of drawbacks. For example, the user cannot read a numerical display from a distance or over a broad range of viewing angles. Accordingly, a numerical display requires the user to be closely positioned in front of the display to read utility usage values. This means that the user must take the time to get positioned close enough to read the display. Even when the user is close to a numerical display, a significant portion of the population must then take the time to put on their reading glasses in order to view a numerical display. Further, since a numerical display lacks the visual capability to alarm or signal a user over to the display, the user must take the time to repeatedly approach the display to check usage information. If the user does not take the time to approach the display, it may be to late to adjust consumption to stay within a budget. Due to the lack of signaling capability, the user may not be motivated to take the time or even remember to view a numerical display monitor at all. Further, to be effective, at least two displays are generally required, i.e., one displaying actual use and one displaying the target or budgeted use level, in order to provide the user with over/under budget information. Still further, the numeric display may not be understandable to the youngest members of a household who very often can be the worst offenders in terms of wasting energy.

Some energy monitors include an alarm that sounds when energy consumption exceeds some preset budget level. However, alarm-type energy monitors also present a variety of drawbacks. For example, alarm sounding could occur at any time of day or night and thereby become an annoyance and/or an embarrassment. This could lead the user to either disconnect the alarm or set a high budget level which, of course, defeats the whole purpose of the alarm. Further, since the alarm typically sounds when energy consumption has reached or passed a budget level, the user is not provided with a warning to reduce energy consumption before the alarm sounds.

A power meter disclosed in U.S. Pat. No. 5,811,966 includes the use of colored LED's to indicate whether an appliance plugged into the power meter is a high or low power consumption device. Specifically, one color is used to indicate a high energy consumption device and a second color is used to indicate a low energy consumption device. However, the power meter does not provide any indication of a consumer's usage of a utility relative to a user-selected budgeted or peak amount.

SUMMARY OF THE INVENTION

Accordingly, it is an object of the present invention to provide a method and system for signaling utility usage.

Another object of the present invention is to provide a method and system that provides a continuous signal indicative of utility's usage.

Still another object of the present invention is to provide a method and system that continuously indicates utility's usage relative to a threshold level of usage.

Yet another object of the present invention is to provide a method and system that continuously indicates a utility's usage in a simple manner.

A further object of the present invention is to provide a method and system in which a signal indicative of utility usage can be viewed from a distance, can be viewed from a broad range of viewing angles, and can be understood while one is moving.

Other objects and advantages of the present invention will become more obvious hereinafter in the specification and drawings.

In accordance with the present invention, a method and system are provided to continuously signal a utility's usage at a location where a commodity indicative of the utility is provided via a supply line. A first device is coupled to the supply line to measure usage of the commodity and provide a first value indicative of the usage. A second device is provided to allow a user to input a second value indicative is a threshold level of usage of the commodity. A processor, coupled to the first and second devices, generates a status value based on the first and second values. A reconfigurable display is coupled to the processor. The display can illuminate at least one indicator of a first color and at least one indicator of a second color. At any given time, at least one of the indicators is viewable based on the status value. For example, three colored indicators (e.g., red, yellow and green) can be arranged to resemble a traffic signal where green is indicative of an acceptable level of utility usage, yellow is indicative of utility usage that is bordering on excessive, and red is indicative of excessive utility usage.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
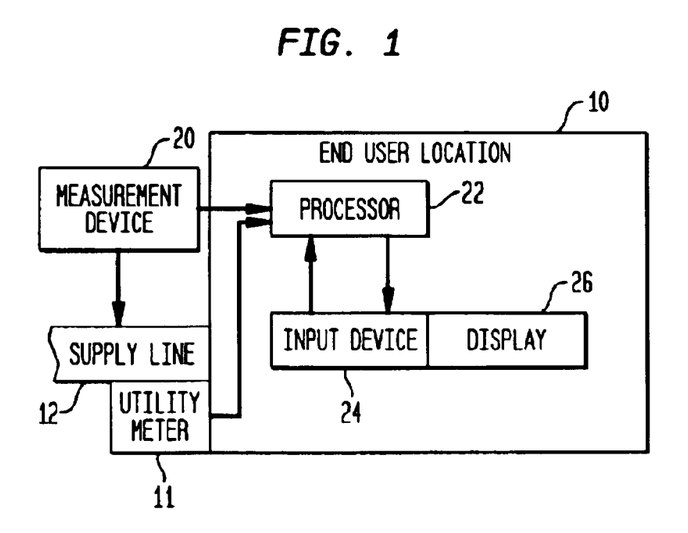
FIG. 1 is a block diagram of one embodiment of a system used to carry out the method of signaling utility usage in accordance with the present invention.

Referring now to the drawings, and more particularly to FIG. 1, a block diagram is illustrated of a system used to carry out the method of signaling a utility's usage in accordance with the present invention. By way of example, the present invention will be explained with respect to the usage of a single utility. However, as will be readily apparent to one skilled in the art, the present invention can easily be extended to signal usage associated with more than one utility.

In FIG. 1, the commodity being supplied by a utility company is delivered to an end user location 10 (e.g., home, office store, etc.) via a commodity supply line 12. The commodity being supplied can be an energy supply (e.g., gas, electricity, etc.) or a non-energy supply such as water. Accordingly, supply line 12 is representative of a fluid delivery conduit, a three-wire 240V/120V electrical service entry, or any other means of delivering a commodity to end user location 10. However, it is to be understood that the term "supply line" as used herein also represents an individual electrical circuit to part of a home, an electrical outlet into which one or more individual appliances can be connected, or the power supply lines within an individual appliance.

Coupled to supply line 12 is a measurement device 20 used to measure the amount of the commodity being delivered to end user location 10. Measurement device 20 can be implemented in a variety of ways depending on the type of commodity being monitored. For example, if electricity is being monitored, measurement device 20 could be coupled to the main circuit breaker panel (not shown) maintained at end user location 10. If gas or water is the commodity being measured, measurement device 20 could be a flow meter (not shown). Regardless of the type of commodity being monitored, measurement device 20 could also be coupled to a utility meter 11 maintained at end user location 10. That is, measurement device 20 could be realized by an automatic meter reader, a variety of which are known in the art.

The amount of the commodity being consumed is supplied to a processor 22 which has internal (or external) memory capacity and an internally-based (or externally-accessed) timekeeping/calendar capacity. Processor 22 is programmed to process the information in one or more ways as will be explained further below. Additional information to be handled by processor 22 includes that supplied to an input device 24 capable of displaying received inputs (e.g., keypad or keyboard coupled to a display 26, touchscreen, voice recognition system coupled to a display, etc.). Displaying a user's inputs allows the user to see and verify the inputs being made. The additional information input at device 24 can include, but is not limited to information such as the following:

fixed or variable utility rate information so that the amount of usage supplied from measurement device 20 can be converted to a monetary equivalent;

budget level(s) in terms of either an amount of the commodity or a monetary denomination;

a plus/minus budget tolerance amount or percentage;

a start time, i.e., calendar day and time, indicative of when monitoring should begin;

a time or billing period over which monitoring and budget level is based or when the billing/budget period ends; and a desired peak level of instantaneous usage or average usage over a window of time where the level could be in quantities of power or an energy/commodity flow rate.

In other embodiments of the invention, most or some of the functions of measurement device 20 can be incorporated into processor 22 or a unit hosting processor 22. That is, electronic components that support measurement functions provided by measurement device 20 can be included on a circuit board, in a case or on a computer chassis used to host processor 22. In some embodiments, measurement device 20 might only provide processor 22 with an analog electrical signal representative of the commodity or components of the commodity, e.g., a level of current, voltage, power, volume flow of gas, etc. Processor 22 by itself (or in conjunction other electronic devices within the same unit as processor 22) could be used to assist in sampling, perform analog-to-digital conversion, calculate instantaneous levels of power and average power, and/or derive energy from average power and time values. Processor 22 could also be used to convert commodity flow rates of natural gas, oil or propane monitored during a period of time into energy quantities. Therefore, it is not the intent of the present invention to define the usage measurement functions/techniques provided by processor 22 or at the location of processor 22. It is to be understood that there are many ways to measure utility usage.

After processing commodity usage information and user-supplied information, processor 22 outputs a status value indicative of utility usage. The status value is provided, for example, through input device 24 to display 26 which can be part of input device 24 as illustrated. Alternatively, the display can be a separate, remotely-located device that receives the status value directly from processor 22. Either way, display 26 provides a user with a continuous indication of utility usage in accordance with the present invention.

Display 26 is typically positioned in end user location 10 so that it is readily visible to all occupants/users thereof. For example, if electricity or gas is being monitored, display 26 can be located in proximity to, or incorporated into, a thermostat (not shown). If water is the commodity being monitored, display 26 could be located near a faucet, bath or shower. Further the attributes of display 26 for purposes of the present invention could be implemented with software running on a personal computer so that one or more utilities can be monitored simultaneously as will be described further below. Display 26 could also be realized by a television or home control monitor.

Referring now to FIGS. 2–8, various embodiments of display 26 (i.e., displays 26A–26G, respectively) are illustrated to highlight the advantages and versatility of the present invention. However, it is to be understood that other embodiments of display 26 can be used without departing from the scope of the present invention. Following a description of each display's configuration, various methods of using the displays will be provided.

Figure 2:
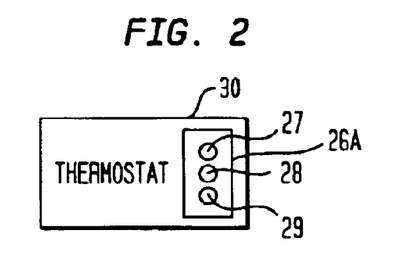
FIG. 2 is a diagrammatic view of an embodiment of a display used in the present invention as it is incorporated into a thermostat.

In FIG. 2, a display 26A is incorporated into a thermostat 30 which can be a programmable thermostat. (Note that processor 22 and input device 24 (FIG. 1) could also be incorporated into thermostat 30 and used to process thermostat functions as well as those for the present invention.) Display 26A is characterized by a set of three different color indicators 27, 28 and 29, which can be made visible (turned on) or invisible (turned off) in accordance with the status value supplied thereto. In this embodiment, indicators 27, 28 and 29 are arranged in a vertical orientation. Typically, each of indicators 27, 28 and 29 is a light (e.g., light emitting diode or LED, an incandescent bulb, etc.). Each of indicators 27, 28 and 29 is configured to display a unique color when made visible or turned on. In the preferred embodiment, indicator 27 is red, indicator 28 is yellow and indicator 29 is green. Thus, display 26A is configured similar to a traffic signal.

Figure 3:
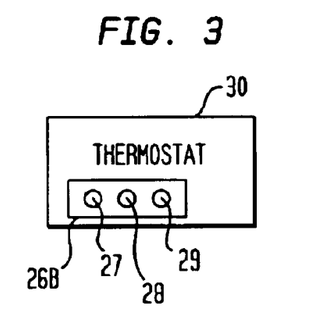
FIG. 3 is a diagrammatic view of another embodiment of a display used in the present invention.

In FIG. 3, indicators 27, 28 and 29 are arranged horizontally on display 26B. In the preferred embodiment of FIG. 3, indicators 27, 28 and 29 once again display red, yellow and green, respectively, when made visible or turned on.

Figure 4:
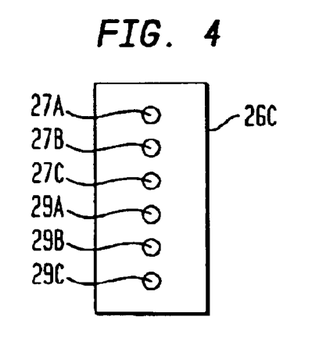
FIG. 4 is a diagrammatic view of another embodiment of a display that uses a series of indicators/lights to signal various utility usage conditions.

While the previous embodiments use three-color traffic light indicator displays, the present invention is not so limited. In FIG. 4, display 26C is characterized by a plurality of red and green indicators. For example, indicators 27A–27C could be red and indicators 29A–29C could be green. Display of all green indicators 29A–29C could signal that usage was well within budget. A successive reduction in the number of green indicators 29A–29C made visible or turned on could signal that the budget level was being approached. Similarly, display of a single one of red indicators 27A–27C could signal usage that was slightly over budget while display of all red indicators 27A–27C could signal usage that was way over budget.

Figure 5:
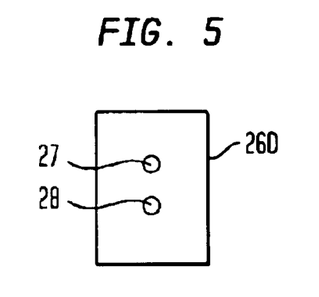
FIG. 5 is a diagrammatic view of another embodiment of a display that uses indicators/lights having only two colors.

Display 26D in FIG. 5 makes use of just indicators 27 and 28 which could respectively be red and green, yellow and green, or red and yellow. Further, it is to be understood that the present invention could use closely-packed indicators occupying a single viewing space or a single indicator capable of displaying the necessary different colors (e.g., red, yellow and green).

Figure 6:
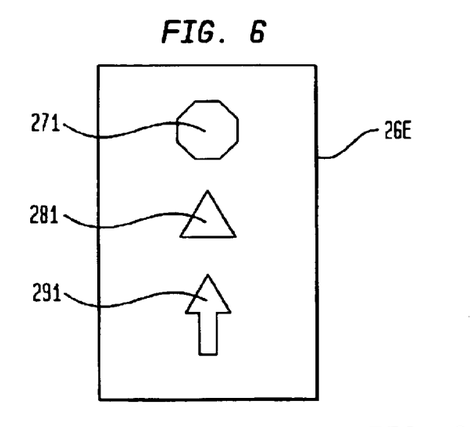
FIG. 6 is a diagrammatic view of another embodiment of a display that uses specifically shaped indicators.
Figure 7:
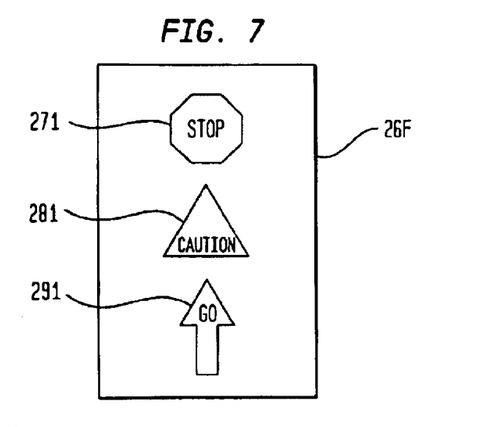
FIG. 7 is a diagrammatic view of another embodiment of a display in which each indicator/light further displays a symbolic and/or word indicia indicative of utility usage conditions.

In FIG. 6, display 26E is characterized by vertically-aligned indicators 271, 281 and 291, each of which has a specific shape to further enhance recognition of a utility usage condition. For example, indicator 271 is octagonal and could be red when made visible or turned on, indicator 281 is triangular and could be yellow when made visible or turned on, and indicator 291 is shaped like an upwardly-directed arrow and could be green when made visible or turned on.

In FIG. 7, display 26F is again characterized by shaped indicators 271, 281 and 291. Additionally, when made visible or turned on, each of the indicators could display an indicia such as the word "STOP" on red indicator 271, "CAUTION" on yellow indicator 281, and "GO" on green indicator 291. However, it is to be understood that other words and/or symbols could be used as will be described further below.

Figure 8:
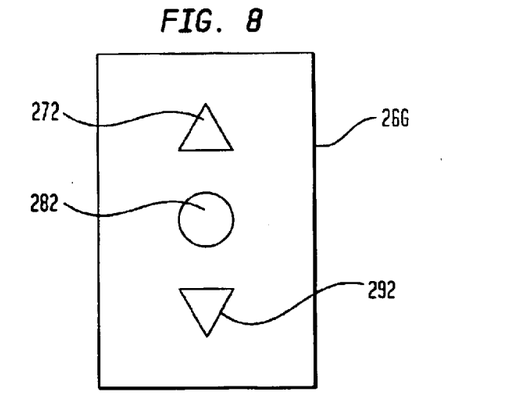
FIG. 8 is a diagrammatic view of another embodiment of a display that uses specifically shaped indicators.

In FIG. 8, display 26G is characterized by indicators 272, 282 and 292 where indicator 272 is an "up" arrow and indicator 292 is a "down" arrow. Indicator 272 could be red to signal "over budget", indicator could be yellow to signal "near budget", and indicator 292 could be green to signal "under budget". Note that indicator 282 could be omitted if a two-color display is used.

Figure 9A:
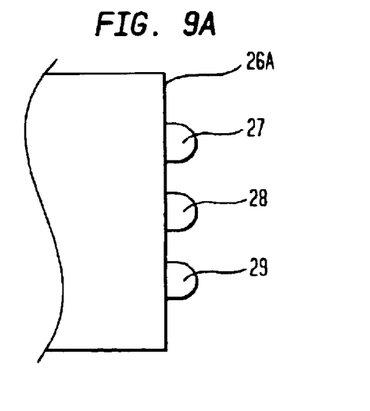
FIG. 9A is a diagrammatic side view of the display used in FIG. 2 where each indicator is mounted to protrude from a flat surface.
Figure 9B:
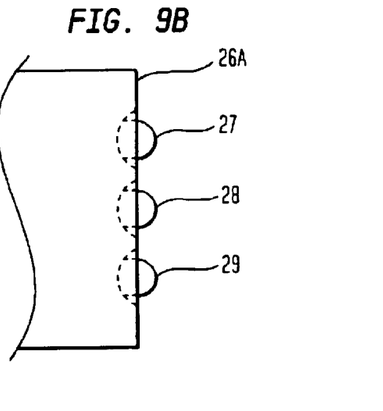
FIG. 9B is a diagrammatic side view of the display used in FIG. 2 where each indicator is mounted to protrude from a concave depression in the surface.

To improve the wide-angle visibility of any of the above-described displays, each indicator can protrude from its housing and into the airspace in front of the display. For example, as illustrated in alternative side views of display 26A in FIGS. 9A and 9B, each of indicators 27, 28 and 29 could protrude beyond a flat-faced housing (FIG. 9A), or could protrude from concave depressions in the face of the housing (FIG. 9B).

Each of the above-described display configurations can be used in a variety of ways to continuously signal utility usage. By way of example, three methods of use will be described herein. Referring again to FIG. 1, the first method requires that a budget level(s) and time or billing period be provided via input device 24. Processor 22 keeps a running total of the actual amount of usage and uses the running total to project what the usage will be at the end of the selected time period. The projected usage is compared with a budget level (e.g., one budget level could be used to dictate a green-to-yellow change and a second higher budget level could be used to dictate a yellow-to-red change) to produce/supply the status value output from processor 22 to display 26. Typically, the projected usage is subtracted from the budget level to produce a positive status value when usage is projected to be under budget and a negative status value when usage is projected to be over budget. The amount of the status value could be compared to the budget tolerance value or percentage to determine which indicator(s) to illuminate or make visible.

There are a variety of ways in which display 26 can use the status value from processor 22, several of which will now be explained by way of non-limiting examples. In terms of the three-color displays, the green indicator alone could be made visible or turned on when the projected usage is:
 less than the budget level;
 less than or equal to the budget level; or
 less than the budget level minus a budget tolerance.
The yellow indicator alone could be made visible or turned on when projected usage:
 falls within a range that is the budget level plus or minus the budget tolerance; or
 within some prescribed portion of this range.
The red indicator alone could be made visible or turned on when the projected usage is:
 more than the budget level;
 equal to or more than the budget level; or
 more than the budget level plus the budget tolerance.
In terms of the two color displays, one or both colors could be made visible or turned on to signal utility usage. For example, if the colors were green and red, only green might be on when projected usage was well within budget; only red might be on when projected usage was well over budget; and both green and red could be on when projected usage was within a range defined by the plus or minus budget tolerance.

When employing this first method, it may be necessary or desirable for processor 22 to incorporate a compensation or smoothing technique to account for different levels of utility consumption during the course of a day. This is because night and day consumer activities typically create a cyclic pattern of extended periods of low and high levels of usage. Thus, the average level for a single day consists of measurements during the higher use hours and the lower use hours. However, during the first few days of the billing period, measurements taken during the partial day, i.e., the high use or low use part of the day, can skew the average level significantly and thereby adversely impact the billing period's projected use. (Note that the above-described situation occurs when projection of usage for a billing period is based on the average daily level of consumption, but would not occur if projection of usage for a billing period were based on a trend equation that removed the night and day effects of the data.)

To compensate for this situation, processor 22 could be programmed to statistically adjust the partial day usage information. For example, usage information could be analyzed over a time series in order to build a smoothing function which could be additive, multiplicative, exponential or a combination thereof. A variety of statistical smoothing techniques are known in the art. See, for example, "Quantitative Methods for Business," David R. Anderson et al., Fifth Edition, West Publishing Company, 1992.

The smoothing function could also be tailored and/or updated based on usage habits (e.g., normal bedtime, waking time, time leaving/returning from school/work, etc.) which could be input via input device 24. The most current usage information could then be "smoothed" based on the time of day. The smoothing function could also be adaptive in nature so that it is continually updated from the latest recorded usage information.

The average projection method described herein is the preferred projection method because it can be easily understood by the user and only involves simple calculation. However, a projection method other than the average method could be used to project utility usage for the billing period. For example, as the weather gets cooler during the month of October, it is more likely that the end of the month will require more energy in terms of heating than the beginning of the month. A projection method that determines the trend in energy use during the beginning of the billing period will project a higher total over that of an average method of projection for the period. A variety of projection methods based on the trend of the data over a time series or through correlation with other variable data (e.g., historical temperature information) are known in the art. Such projection methods could include ones that determine a linear trend line equation or involve linear regression techniques. Further, the budget amount entered by the user could be trend oriented. For example, the budget level (or budget tolerance percentage) for the beginning of the billing period could be greater or less than the budget level (or budget tolerance percentage) used for the end of the period in order to account for a billing period in which consumption is expected to change. Thus, it is to be understood that the choice of projection method is not a limitation of the present invention.

In accordance with the second method of using the various display configurations, a budget level and time or billing period is again provided via input device 24. Processor 22 keeps a running total of utility usage during the selected time period and compares the running total with the budget level. Once again, the running total usage is typically subtracted from the budget level to produce the status value output from processor 22. As long as the running total is less than the budget level, a positive status value is generated. Once the running total exceeds the budget level, a negative status value is generated. As in the previous method, there are a variety of ways in which display 26 can use the status value from processor 22. In terms of the three-color displays, the green indicator could be made visible or turned on when the running total is less than the budget level. The yellow indicator alone (or in combination with the green or red indicators) could be made visible or turned on when the running total is slightly less than, equal to, and/or slightly greater than the budget level. The red indicator could be made visible or turned on when the running total is greater than the budget level. In terms of two-color displays, one or both colors could be made visible or turned on to signal utility usage relative to the budget level. One possibility is to use green and red indicators in a way similar to that described above for the projected use method.

The third method of using the various display configurations applies to instantaneous usage. For quantities such as power, processor 22 compares instantaneous usage (or average usage amount over a short time window) with the entered peak level of usage to determine if, at any given time, excess usage is occurring. For quantities such as energy, processor 22 converts the accumulated amount monitored over a short time window to the time base of the energy peak value entered by the consumer, and then compares the converted energy value to the peak level of energy entered by the consumer. Even though the meter will measure a value over a small window of time to arrive at a peak value, the user will enter a value of energy that is based on a larger window of time, e.g., day, month, etc. The small measured value is projected out to the time base of the value entered by the user.

If the instantaneous usage is subtracted from the instantaneous peak level of usage, a positive status value is indicative of usage within the prescribed level while a negative status value indicates excessive usage at a given moment in time. In terms of the three-color displays, the green indicator could be made visible or turned on when the instantaneous usage is less than the instantaneous peak level of usage. The yellow indicator alone (or in combination with green or red indicators) could be made visible or turned on when the instantaneous usage is slightly less than, equal to, or slightly greater than, the instantaneous peak level of usage. The red indicator could be made visible or turned on when the instantaneous usage is greater than the instantaneous peak level of usage. In terms of two-color displays, one color could be made visible or turned on to indicate instantaneous utility usage relative to the instantaneous peak level of usage.

The advantages of the present invention are numerous. Usage of one or more utilities can be signaled in a simple arrangement of colored indicators/lights. In the preferred three-color traffic signal embodiments, users of all ages will quickly recognize that green signals utility usage that is within prescribed limits, yellow signals utility usage that is beginning to be excessive and should be curtailed, and red signals utility usage that is exceeding prescribed limits.

Although the invention has been described relative to specific embodiments thereof, there are numerous variations and modifications that will be readily apparent to those skilled in the art in light of the above teachings. For example, rather than measuring the total amount of a commodity being supplied to an end user location as described above, the present invention can be used to monitor a single appliance, e.g., HVAC units, hot water heater, hot tub, etc., at the appliance's supply line or outlet.

Further, when used to monitor a single appliance or functional system such as the HVAC, the indicators could be driven by the amount of time that the appliance is actually used. Since most power ratings are known for an appliance, time-in-use can be multiplied by the appliance's power rating to arrive at an estimated energy consumption value. The energy consumption value could be converted to cost with rate information entered by the user. In addition, just monitoring the amount of time-in-use could be tracked, projected and compared to a budgeted time-in-use value entered by the user. For example, a television could be equipped with an LED display system that signaled when television "on time" was within or exceeded a budgeted amount of "on time".

With respect to the displays, colors other than red, green and yellow can be used without departing from the scope of the present invention. Further, the words or symbols (e.g., a hand signaling "STOP", a "thumbs up" signal, etc.) provided as indicia on the various indicators could be other than that described above with respect to FIG. 7. For example, other suitable words for the green indicator could include "OK", "GOOD", "UNDER", "LOW" or "YES", just to name a few. Other suitable words for the yellow indicator could include "AT BUDGET", "IN RANGE", "SLOW" or "NO". Other suitable words for the red indicator could include "HIGH", "BAD", "OVER" and "NO".

Figure 10:
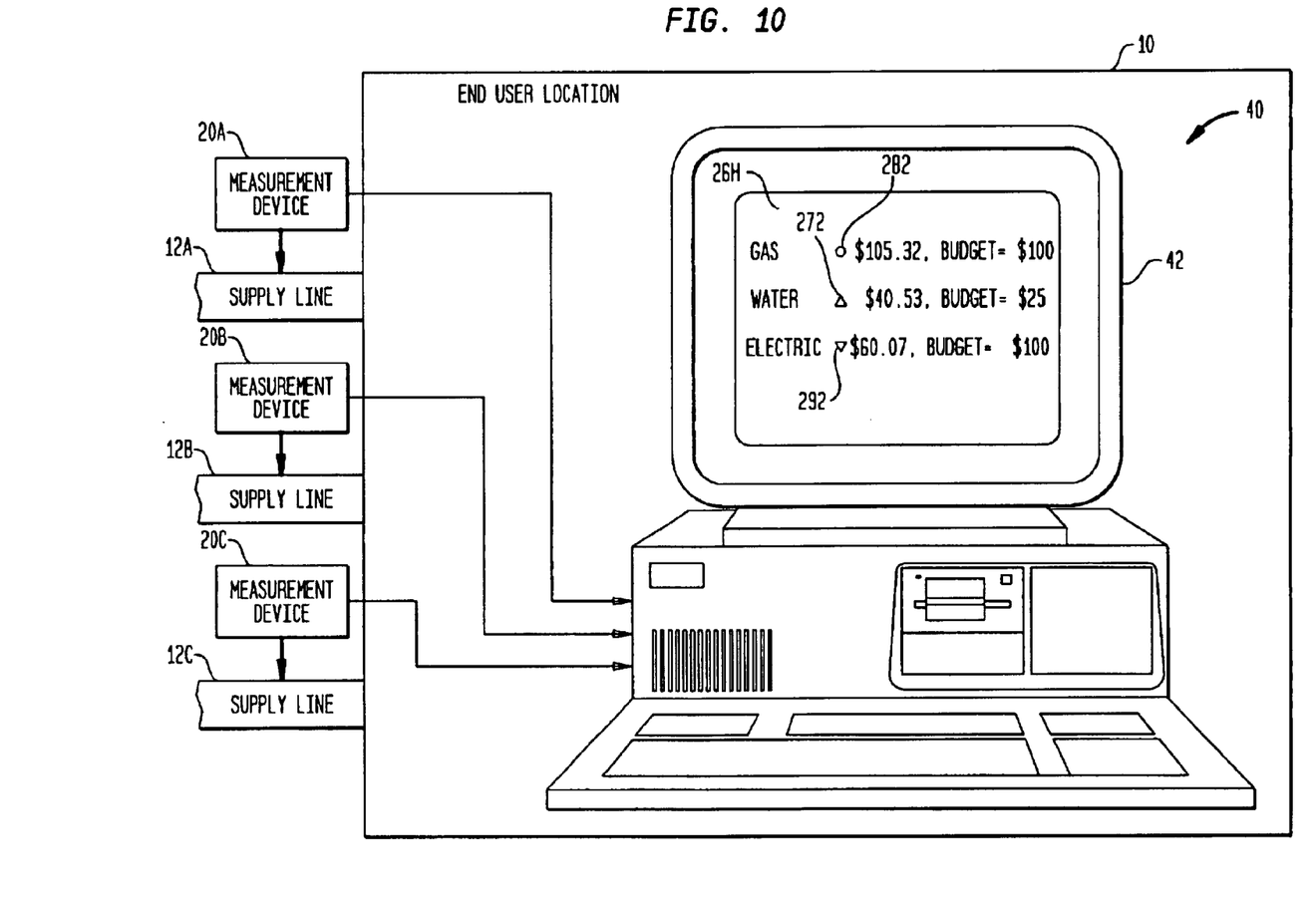
FIG. 10 is a block diagram of another system that can be used to carry out the method of the present invention in which any or all utilities being supplied to a location can be monitored at a single location such as a personal computer.

As mentioned above, the present invention could also be used to monitor a plurality of utilities at the same time. One such system for doing this is depicted in FIG. 10 where a gas supply line 12A, a water supply line 12B and an electric supply line 12C each have a respective measurement device 20A, 20B and 20C coupled thereto. The measurement devices are coupled to system that can receive user commands and display outputs graphically such as a personal computer 40 maintained in end user location 10. Other systems that could be used in place of personal computer 40 include a home control monitor and an television.

Personal computer 40 could be running software similar to that used by processor 22 in the FIG. 1 embodiment. In addition, personal computer 40 could run software that generated display image 26H for signaling gas, water and/or electricity usage on the computer's CRT display 42. Each display image could be designed, for example, to display the appropriate red, yellow and/or green indicator images as described above. That is, each indicator image could be made visible (or invisible) in accordance with a set of predefined conditions to continuously signal utility usage. In addition, since a user would generally be sitting in front of personal computer 40, display image 26H could also include descriptive information (e.g., the type of utility and its budget level) and numeric information (e.g., actual dollars spent). By way of example, display image 26H shows:

i) yellow indicator 282 and verbiage to signal that gas usage is slightly over budget;

ii) red indicator 272 and verbiage to signal that water usage is well over budget; and iii) green indicator 292 and verbiage to signal that electric usage is well under budget.

The descriptive verbiage or the background surrounding the descriptive verbiage could also be colored the same as the indicator with which it is associated.

It is therefore to be understood that, within the scope of the appended claims, the invention may be practiced other than as specifically described.

What is claimed as new and desired to be secured by letters patent of the united states is:

What is claimed is:

1. A method of continuously signaling a utility's usage, comprising the steps of:

providing a reconfigurable display capable of displaying at least one of a plurality of indicators;

providing a first value indicative of a threshold level of utility usage;

determining a second value indicative of a projected level of usage of a utility;

determining a status that is equal to a difference between said first value and said second value;

providing at least one third value indicative of a percentage of said first value; and displaying at least one of said plurality of indicators on said reconfigurable display based on a comparison between said status and said at least one third value, wherein said at least one third value comprises two third values to establish three adjoining ranges of utility usage with a first range defining a lowest amount of utility usage, a second range defining a highest amount of utility usage and a third range defining an amount of utility usage that is between said first range and said second range, each of said two third values defining a boundary level between two adjoining ranges of said three adjoining ranges, each of said three adjoining ranges having a unique configuration of color associated therewith with said first range being associated with the color green, said second range being associated with the color red and said third range being associated with the color yellow wherein, during said step or displaying, said reconfigurable display only displays one of the colors green, red and yellow using at least one of said plurality of indicators.

2. A method according to claim 1 wherein said first value is a budget level of utility usage and said second value is a projected level of utility usage.

3. A method according to claim 1 wherein said first value is a peak level of utility usage and said second value is an instantaneous level of utility usage.

4. A method of continuously signaling with color a utility's current projected usage, comprising the steps of:

providing a reconfigurable display capable of displaying at least one of a plurality of indicators that includes at least one indicator of a first color and at least one indicator of a second color;

providing at least one value indicative of a level of utility usage in correspondence with a billing period;

establishing at least one threshold of utility usage for said billing period using said value corresponding thereto, wherein a plurality of adjoining ranges of utility usage are defined by said at least one threshold for said billing period with each said at least one threshold defining a boundary between two adjoining ranges from said plurality of adjoining ranges, and wherein for said billing period, said value is in one of said plurality of adjoining ranges with at least a portion of one of said plurality of adjoining ranges defining utility usage that is below said value and at least a portion of another of said plurality of adjoining ranges defining utility usage that is above said value;

determining a projection value indicative of a projected level of utility usage for said billing period based on at least a level of utility usage occurring during an expended portion of said time billing period;

determining, for said billing period, a current range of utility usage based on which of said plurality of adjoining ranges said projection value lies within; and displaying, at all times, at least one of said plurality of indicators on said reconfigurable display based on said current range wherein, for said billing period, each of said plurality of adjoining ranges specifies a unique configuration of color that is one of i) a single color, and ii) a combination of different colors displayed separately.

5. A method according to claim 4 wherein, for said billing period and for at least one range from said plurality of adjoining ranges, said method further comprises the steps of:

establishing at least one sub-threshold of utility usage within said at least one range using said value corresponding thereto, wherein a plurality of adjoining sub-ranges of utility usage are defined by said at least one sub-threshold with each said at least one sub-threshold defining a boundary between two adjoining sub-ranges from said plurality of adjoining sub-ranges;

determining, for said current time period, a current sub-range of utility usage based on which of said plurality of adjoining sub-ranges said projection value lies within when said current range lies within said at least one range; and displaying, based on said current sub-range, a unique arrangement of said plurality of indicators when said current range lies within said at least one range, wherein said unique arrangement is defined by one of i) a specified number of said plurality of indicators, ii) a specified position of said plurality of indicators, and iii) a combination of a specified number of said plurality of indicators and a specified position of said plurality of indicators.

6. A method according to claim 4, wherein said plurality of indicators include a plurality of red indicators and a plurality of green indicators, each of said plurality of adjoining ranges below said value being associated with a specific number of said plurality of green indicators and each of said plurality of adjoining ranges above said value being associated with a specific number of said plurality of red indicators.

7. A method according to claim 4, wherein said expended portion of said billing period is a window of time therefrom, and wherein said step of determining said projection value comprises the step of projecting said level of utility usage occurring during said window of time to a time base of said billing period.

8. A method according to claim 4, wherein said plurality of indicators further includes at least one indicator of a third color, and wherein said first color is green, said second color is yellow and said third color is red.

9. A method according to claim 4, wherein said step of providing further comprises the step of locating said reconfigurable display in proximity to a control that can regulate usage of the utility.

10. A method according to claim 4, wherein said at least one value is in monetary denominations.

11. A method according to claim 4, wherein said at least one value is in units of measure of a commodity provided by the utility.

12. A method according to claim 4, further comprising the step of applying a statistical smoothing function to said level of utility usage occurring during said expended portion of said billing period, wherein said statistical smoothing function compensates for varying levels of utility usage during said expended portion of said billing period.

13. A method according to claim 4, further comprising the step of displaying alphanumeric characters indicative of said current range.

14. A method according to claim 13, further comprising the step of displaying said alphanumeric characters against a background color that is changed in accordance with said status.

15. A system for continuously signaling with color a utility's current projected usage, comprising:

a reconfigurable display capable of displaying at least one of a plurality of indicators that includes at least one indicator of a first color and at least one indicator of a second color;

means for providing at least one value indicative of a level of utility usage in correspondence with a billing period;

means for establishing at least one threshold of utility usage for said billing period using said value corresponding thereto, wherein a plurality of adjoining ranges of utility usage are defined by said at least one threshold for said billing period with each said at least one threshold defining a boundary between two adjoining ranges from said plurality of adjoining ranges, and wherein for said billing period, said value is in one of said plurality of adjoining ranges with at least a portion of one of said plurality of adjoining ranges defining utility usage that is below said value and at least a portion of another of said plurality of adjoining ranges defining utility usage that is above said value;

means for determining a projection value indicative of a projected level of utility usage for said billing period based on at least a level of utility usage occurring during an expended portion of said billing period; and means for determining, for said billing period, a current range of utility usage based on which of said plurality of adjoining ranges said projection value lies within, wherein at least one of said plurality of indicators on said reconfigurable display is displayed at all times based on said current range and wherein, for said billing period, each of said plurality of adjoining ranges specifies a unique configuration of color that is one of i) a single color, and ii) a combination of different colors displayed separately.

16. A system as in claim 15 wherein, for said billing period and for at least one range from said plurality of adjoining ranges, said system further comprises:

means for establishing at least one sub-threshold of utility usage within said at least one range using said value corresponding thereto, wherein a plurality of adjoining sub-ranges of utility usage are defined by said at least one sub-threshold with each said at least one sub-threshold defining a boundary between two adjoining sub-ranges from said plurality of adjoining sub-ranges; and means for determining, for said current time period, a current sub-range of utility usage based on which of said plurality of adjoining sub-ranges said projection value lies within when said current range lies within said at least one range, wherein a unique arrangement of said plurality of indicators are displayed based on said current sub-range when said current range lies within said at least one range, wherein said unique arrangement is defined by one of i) a specified number of said plurality of indicators, ii) a specified position of said plurality of indicators, and iii) a combination of a specified number of said plurality of indicators and a specified position of said plurality of indicators.

17. A system as in claim 15, wherein said plurality of indicators include a plurality of red indicators and a plurality of green indicators, each of said plurality of adjoining ranges below said value being associated with a specific number of said Plurality of green indicators and each of said plurality of adjoining ranges above said value being associated with a specific number of said plurality of red indicators.

18. A system as in claim 15, wherein said plurality of indicators further includes at least one indicator of a third color, and wherein said first color is green, said second color is yellow and said third color is red.

19. A system as in claim 15, wherein said step of providing further comprises the step of locating said reconfigurable display in proximity to a control that can regulate usage of the utility.

20. A system as in claim 15, wherein said at least one value is in monetary denominations.

21. A system as in claim 15, wherein said at least one value is in units of measure of a commodity provided by the utility.

22. A system as in claim 15, further comprising means for applying a statistical smoothing function to said level of utility usage occurring during said expended portion of said billing period, wherein said statistical smoothing function compensates for varying levels of utility usage during said expended portion of said billing period.

23. A system as in claim 15, further comprising means for displaying alphanumeric characters indicative of said current range.

24. A system as in claim 23, further comprising means for displaying said alphanumeric characters against a background color that is changed in accordance with said status.

* * * * *